United States Patent
Della Vedova

[19]

[11] Patent Number: 6,166,537
[45] Date of Patent: Dec. 26, 2000

[54] METHOD TO MEASURE THE VARIATIONS IN SECTION OF A ROLLED BAR WHILE MINIMIZING THE INFLUENCE OF TEMPERATURE

[75] Inventor: Ferruccio Della Vedova, Zugliano, Italy

[73] Assignee: Centro Automation SpA, Italy

[21] Appl. No.: 09/046,543

[22] Filed: Mar. 24, 1998

[30] Foreign Application Priority Data

Mar. 24, 1997 [IT] Italy .................................. UD97A0052

[51] Int. Cl.⁷ .............................. G01R 33/12; G01B 7/00; G01N 27/72
[52] U.S. Cl. ........................ 324/225; 324/240; 324/239
[58] Field of Search .................... 324/225, 238, 324/239, 240, 241, 242, 262

[56] References Cited

U.S. PATENT DOCUMENTS 3,056,081  9/1962  Hochschild .
4,083,002  4/1978  Allport .

FOREIGN PATENT DOCUMENTS 1505716   2/1968   France .
2435338   2/1976   Germany .
9015965  12/1990   WIPO .

*Primary Examiner*—Walter Snow
*Attorney, Agent, or Firm*—Antonelli, Terry, Stout & Kraus, LLP

[57] ABSTRACT

Method to measure the variations in section of a hot rolled bar (12) as it is fed, the method including the generation of a variable frequency magnetic field by at least a generator device (14) defining an inner space (214) for the transit of the bar (12), the variations in section of the bar (12) in transit being measured by a receiver device (15) suitable to monitor the perturbations induced on the magnetic field by the variations in the area of section of the bar (12) in transit. The receiver device (15) is arranged coaxial and inside the generator device (14) and defines inside the same a surface for the transit of the bar. The (12) has a transverse section of ($A_s"$), and the value ("$f_0$") of the frequency of the magnetic field generated by the generator device (14) is suitable to minimize the influence of the real temperature of the bar (12) on the measurement.

3 Claims, 1 Drawing Sheet

METHOD TO MEASURE THE VARIATIONS IN SECTION OF A ROLLED BAR WHILE MINIMIZING THE INFLUENCE OF TEMPERATURE

BACKGROUND OF THE INVENTION

This invention concerns a method to measure the variations in section of a rolled bar.

The invention can be applied substantially in every type of rolling and/or finishing process, on hot bars as they are being fed at high and very high speed, both in the inter-stand segments and also at the inlet or outlet of a rolling train.

The invention makes it possible to monitor the variations in the area of the normal section at the rolling axis of the bar as it is fed, and to measure the entity thereof, in order to determine, in an extremely precise and substantially instantaneous manner, whether there is any difference compared to the programmed nominal area.

Moreover, the invention makes it possible to take speedy correction measures, for example adjustments and modifications to the clearances of the stands upstream or downstream or of the inter-stand drawing force if the variations monitored exceed allowed and pre-defined values of tolerance.

One of the most common problems in hot rolling processes, particularly in the production of long products and/or in plants where rolling takes place directly in line with the casting, is that it is necessary to ensure that the area of section of the bar being rolled is maintained at the programmed nominal values, within a tolerance value which is allowed and can be pre-set in advance, for the whole of its lengthwise extension.

For it is known that deformations and reductions of the bar can cause variations in section of the bar which make the bar, or sections thereof, exceed an allowed tolerance of size; these deformations and reductions can be caused by such factors as: an inconstant and disuniform drawing force, progressive wear of the rolls, an incorrect action of the drawing assemblies, lengthwise deformities in the composition of the material, variations in temperature or other factors.

This can cause an unacceptable deterioration in the quality of the material and it may be necessary to resort to auxiliary finishing processes and even to discard a large quantity of the product.

The state of the art covers U.S. Pat. No. 4,607,511 which includes systems to measure the size of the rolled product in transit so as to identify in an indirect manner the value of the inter-stand drawing force to which the rolled product is subjected.

U.S. Pat. No. '511 includes an optical device to measure the diameter located at the outlet of the rolling stand downstream and a similar optical device located at the inlet of the rolling stand upstream.

These devices are very delicate and must be protected, particularly from water and steam, so that their structure and functioning are not compromised.

Moreover, using the measurement of the diameter to obtain the area of section of the bar in transit involves extremely complex calculations, which require a long time before the result is obtained.

JP-A-089124 includes a device to measure the diameter which measures the dimensional pulses of the rolled product in transit; however, if dimensional pulses are perceived, this means that the product is already beyond the tolerance of size and therefore no longer acceptable.

Devices to measure diameter which are known to the state of the art are generally delicate in functioning and therefore not very suitable to working environments such as those of a rolling mill, they do not give a direct and therefore instantaneous measurement, on the contrary they require a long time and complex calculations to obtain the result, and moreover they are very often easily influenced by external disturbances.

U.S. Pat. No. 4,083,002 and DE-A-24 35 338 describe measuring devices comprising substantially a first solenoid which coaxially surrounds a metallic bar as it is fed, and generates a magnetic field which uniformly fills its free inner space, and at least a second coil inside the first solenoid but outside and coaxial to the bar.

The passage of the bar causes a displacement of the lines of force of the magnetic field produced by the first solenoid, which displacement is monitored by the second coil.

By measuring the signals induced on the second coil, it is possible to obtain a measurement of the transverse section of the advancing bar.

Although these devices known to the art are appreciated in themselves because they perform sensitive measurements, they have shown that they lack accuracy inasmuch as they are greatly influenced by the variations in the process parameters, and particularly by the temperature of the bar which is to be measured The present applicant has found that when measuring the sections of metallic bars at different temperatures there are great differences in the values monitored, and therefore these measurements cannot be considered completely reliable in a wide range of situations and particularly on bars leaving a hot rolling mill, which can have quite different temperatures.

The present applicant has designed, tested and embodied this invention to overcome the shortcomings of the state of the art and to achieve further advantages.

BRIEF SUMMARY OF THE INVENTION

The purpose of the invention is to obtain a method to monitor the variations in the area of section, with respect to the nominal value, of a hot bar being fed at high or very high speed along a rolling line, and to measure the entity of those variations, ensuring an extremely accurate measurement and also a substantially instantaneous result.

To be more exact, the purpose of the invention is to obtain a measurement which, there being defined at the outset specific reference conditions and parameters such as the composition of the material, temperature, area of nominal section, etc., will be influenced only minimally by variations in those reference conditions except for the variations in the area of nominal section around the reference parameters.

To be more exact, the invention proposes to obtain a measurement which is only minimally influenced by the variations in the temperature of the bar; this is because the temperature is a parameter which it is difficult to control rigorously under operating conditions and yet at the same time it is a factor which can considerably affect the efficiency and accuracy of the measurement, as often happens in systems known to the state of the art.

A further purpose of the invention is to use the measurements of variation to make corrections if necessary, for example to adjust the clearances of the rolling stands upstream or downstream, or of the inter-stand drawing force, if the differences in size detected exceed pre-defined values of tolerance.

The device which achieves the method is simple in configuration and inexpensive to construct and manage; the calculations to obtain the desired measurement are relatively simple yet at the same time they ensure extreme accuracy and reliability.

The invention is applied advantageously, although not necessarily, to plants where the rolling line is located in a cascade connection with the continuous casting machine and may be applied in any intermediate position between two rolling stands, with or without an intermediate drawing assembly, or at the outlet or inlet of the rolling train, whether it be a roughing train, a pre-finishing train or a finishing train.

According to the invention, the bar in transit which is to be measured is subjected to the action of a variable magnetic field generated by a generator device arranged coaxially with the bar and defining a cylindrical inner volume through which the rolled bar passes.

The force lines of the magnetic field generated by the generator device are arranged parallel to the axis of feed of the bar, and are distributed uniformly, at least around the measurement zone, over the inner transit volume of the bar. The uniform distribution of the force lines of the magnetic field in the measurement area makes the measurement substantially unaffected by any displacement of the bar being fed in any transverse direction with respect to the longitudinal axis of the generator device.

According to the invention, the variations in the section of the bar in transit are measured by a receiver device, arranged coaxially and inside the generator device.

The receiver device has a lengthwise extension which is much less than that of the generator device and defines inside itself a surface through which the bar which is to be measured can pass.

In the preferred, but not restrictive, embodiment of the invention, the receiver device is arranged in a central position with respect to the generator device, that is to say, in the position where the force lines of the magnetic field have their maximum uniformity.

The receiver device is suitable to measure the perturbations, caused by the variations in the area of the section of the bar in transit, of the magnetic field generated by the generator device.

More specifically, the receiver device detects the entity of the perturbations of the magnetic field and transforms the data into a variation of the phase of the signal relating to the magnetic field generated by the generator device.

Although, as we have said, this measurement can be influenced by other factors, not only by the area of section of the bar in transit, but also for example by the temperature, the material, disturbances, etc., the invention provides to use a variable magnetic field at a chosen frequency in such a way as to minimise the incidence of other factors on the measurement made.

In this way, high precision and accuracy of measurement is guaranteed, substantially independent of, or dependent only minimally on, any variations in these parameters, particularly the temperature, with respect to the values pre-defined as reference values.

To be more precise, according to the invention, the chosen frequency "$f_0$" of the variable magnetic field generated by the generator device is a function at least of the surface defined inside the receiver device, taken in a normal direction to the axis of feed of the bar, and of the filling factor, that is to say the ratio between the area of section of the rolled product and the area of surface defined inside the receiver device, normal to the axis of feed of the bar.

BRIEF DESCRIPTION OF THE DRAWINGS

The attached figures are given as a non-restrictive example, and show some preferred embodiments of the invention as follows.

DETAILED DESCRIPTION OF THE INVENTION

Figure 1:
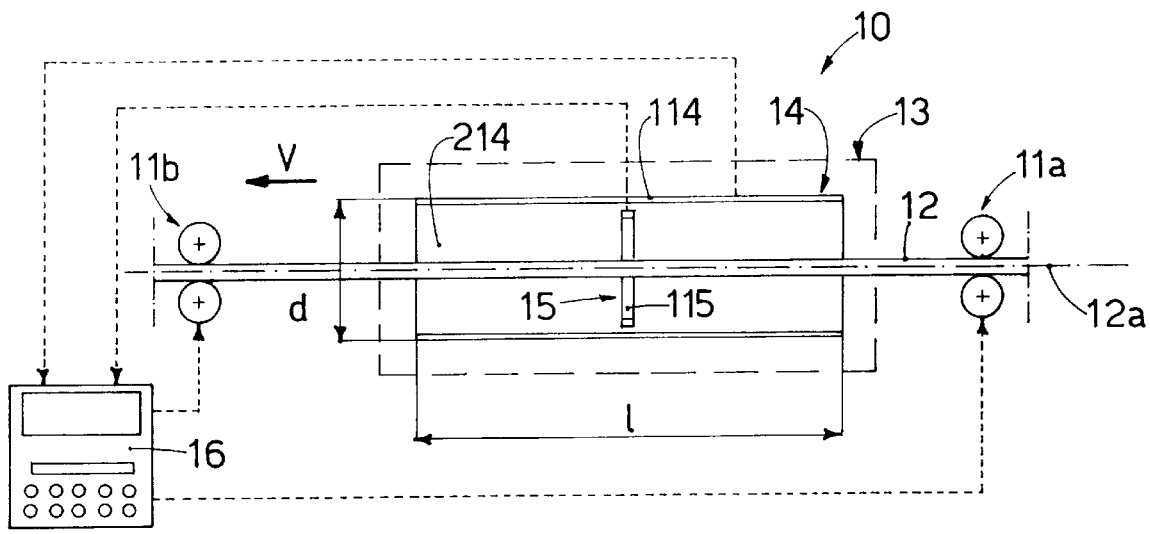
FIG. 1 shows in diagram form the measurement device according to the invention.

In FIG. 1, the number 10 denotes a segment of a rolling line comprising two stands or rolling assemblies, referenced by 11a, 11b.

Those elements shown by 11a, 11b can also represent fast rolling blocks, drawing assemblies, pinch-rolls or any other system which causes a lengthwise drawing force along the section of the hot bar 12 being fed at high or very high speed "V".

Each element 11a, 11b can be respectively preceded or followed by shearing means, heating means, cooling means, conditioning means or any other operational unit acting on the bar 12.

The device 13 to measure the variations in section of the bar 12 in transit is shown in FIG. 1 arranged in the inter-stand segment 10; it could however be used at any desired point on the line, for example upstream of the stand 11a or downstream of the stand 11b.

The device 13 comprises a device 14 to generate a variable magnetic field and a receiver device 15, both arranged coaxially with the nominal axis of feed 12a of the hot bar 12 in transit and connected to a control and command unit 16.

The generator device 14 consists in this case of a solenoid 114 of great length; in this specific case, it has a length "l" at least three times its diameter "d". The solenoid 114 defines an inner volume 214 through which the bar 12 passes, inside which the force lines of the magnetic field are arranged substantially parallel to the nominal axis 12a of feed of the bar, which coincides with the axis of the solenoid 114. The force lines of the magnetic field, moreover, given the high ratio between the length "l" and the diameter "d", fill the inner volume 214 uniformly at least in the area defined by the inner surface of the receiver device 15, so as to render the measurement substantially unaffected by the displacements of the bar 12 in any direction at a right angle to its own nominal axis of feed 12a.

The receiver device 15 consists in this case of a solenoid 115 located inside the solenoid 114 and defining therein a transit surface for the bar 12.

In this case, the solenoid 115 is located in a central position with respect to the solenoid 114 so that it is positioned where the force lines of the magnetic field are most uniform.

In order to ensure accuracy of measurement, the solenoid 115 has a much smaller lengthwise extension than the solenoid 114, so as to render negligible the effect of its length in the direction of the nominal axis of feed.

The solenoid 115 detects the perturbations induced by the transit of the bar 12 on the variable magnetic field generated by the solenoid 114.

To be more exact, the solenoid 115 detects the perturbations on the magnetic field, with respect to the ideal condition of no variation, induced by variations in the area of section of the bar 12 in transit, transforming them into phase variations of the signal received. The signal thus received is sent to the control and command unit 16 which decodes it and identifies, for example continuously, the value of the variation in the area of section of the bar 12 in transit.

It is possible to memorise in the control and command unit 16, for example at the beginning of the rolling cycle or according to specific tabular values, the allowed values of dimensional tolerance inside which a variation in section is considered acceptable.

When these values of tolerance are exceeded, the control and command unit 16 includes an intervention procedure, for example an adjustment in the clearances of the rolls in the rolling stand 11a or 11b, or a variation in the inter-stand drawing force, in order to correct any unacceptable differences in size.

There may also be a threshold value of maximum difference; if this is exceeded, the control and command unit 16 will order the line to be stopped and the bar 12, or part of the bar, to be discharged, as it would not be acceptable according to the standards of quality required.

Figure 2:
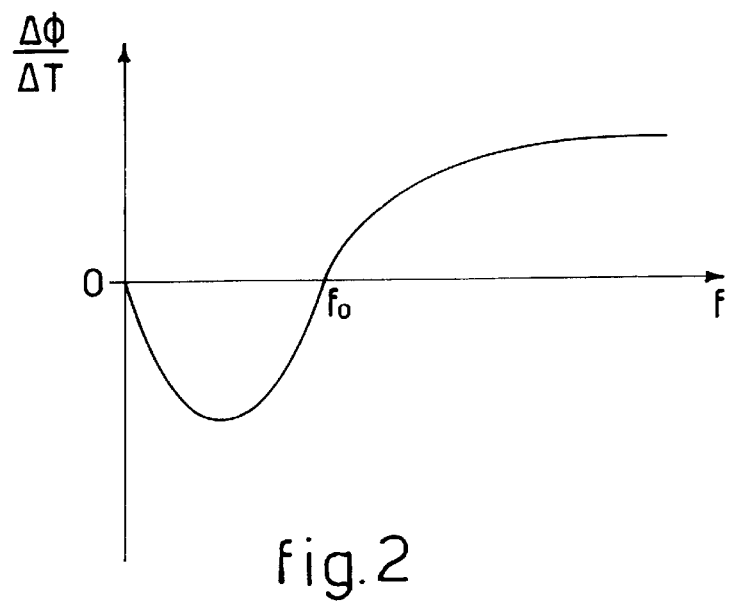
FIG. 2 shows a graph of the relationship between the working frequency and the measurement signal monitored.

The present applicant has discovered that, with the configuration of the invention as described above, the curve representing the function which connects the variation of the phase signal detected by the solenoid 115, when the conductivity and therefore the temperature of the bar changes, with respect to the frequency of the magnetic field generated by the solenoid 114, passes through zero by a determined value "$f_0$" of that frequency (FIG. 2).

Therefore, with this frequency "$f_0$" the effects on the measurement of variations in temperature of the bar 12, with respect to the values set at the beginning of the cycle as reference values, are minimised; the measurement therefore substantially depends only on the variations in the area of section of the bar 12 in transit.

According to the invention, the value "$f_0$" of this frequency is identified as follows.

The surface area defined inside the solenoid 115 in the normal direction to the axis 12a is defined as "$A_S$"; the filling factor of the solenoid 115 is defined as "F", that is to say, the ratio between the area of normal nominal section of the bar 12 and the value "$A_S$"; the invention thus provides that the frequency "$f_0$" is:

$$f_0 = A_S/\mu_0 \sigma F \Delta_0^2$$

where $\mu_0$ is the permeability of vacuum, $\sigma$ is the conductivity of the material of which the bar 12 is composed at the average temperature of measurement and $\Delta_0$ is a coefficient function of the filling factor "F" and calculated with the following formula:

$$\Delta_0 = a + bF^p - c[1 + 1/(1-F)^q]$$

In the preferential embodiment of the invention corresponding to the maximum accuracy of measurement, the coefficients a, b, c, p and q have the following values: a=0.5767; b=0.1554; c=8.516×10⁻³; p=1.267; q=0.9192.

These values make it possible to determine the point where the curve of the function which connects the variation of phase "φ" of the signal detected by the solenoid 115 passes through 0; this variation is used as a parameter of measurement, according to the conductivity "σ" of the bar 12 (as shown on the 'y' coordinates in the graph in FIG. 2), to the frequency "f" of the magnetic field generated by the solenoid 114 (shown on the 'x' coordinates).

By using a variable magnetic field at a frequency "$f_0$" calculated in the above described manner, it is therefore possible to minimise and even annul the influence which the variations in temperature of the bar 12 have on the measurements, and optimise the performance of the measuring device 13.

What is claimed is:

1. Method to measure the variations in section of a hot rolled bar being fed at high or very high speed, the method being applied in a segment of a rolling line between two stands or at any desired point in the rolling line, the method using at least a control and command unit and including the generation of a variable frequency magnetic field by at least a generator device arranged coaxially to the bar being fed and defining an inner volume for the transit of the bar, the variable magnetic field being defined by lines of force which are arranged parallel to the nominal axis of feed of the bar and occupying uniformly the inner volume at least around the measurement area, the variations in section of the bar in transit being measured by a receiver device suitable to monitor the perturbations induced on the magnetic field by the variations in the area of section of the bar in transit, where the receiver device is arranged coaxial to and inside the generator device and defines inside a surface for the transit of the bar which has a transverse section ("$A_S$"), the receiver device being connected to the control and command unit so as to obtain the value of the variation in section of the bar in transit from the measurement of the perturbations of the magnetic field monitored by the receiver device, the receiver device transforming the perturbations of the magnetic field induced by the variations in the area of section of the bar in transit into phase variations of the signal received, the method being characterized in that the value ("$f_0$") of the frequency of the magnetic field generated by the generator device suitable to minimize the influence of the real temperature of the bar on the measurement is defined by the formula:

$$f_0 = A_S/\mu_0 \sigma F \Delta_0^2$$

where ("$A_S$") is the area of section of the surface defined inside the receiver device, ("F") is the filling factor defined by the ratio between the normal nominal area of section of the bar (12) in transit and the value ("$A_S$"), ($\mu_0$) is the permeability of vacuum, (σ) is the conductivity of the material which makes up the bar at the average temperature of measurement and ($\Delta_0$) is a coefficient which is a function of the filling factor ("F") and calculated with the following formula:

$$\Delta_0 = a + bF^p - c(1 + 1/(1-F)^q)$$

in which the coefficients a, b, c, p, and q have the following values for maximum accuracy of measurement: a=0.5767; b=0.1554; c=8.516; p=1.267; q=0.9192, and wherein the frequency ("$f_0$") of the magnetic field generated by the generator device is controlled to a value based on values of the coefficients a, b, c, p, and q around the values for maximum accuracy of measurement to provide a desired accuracy of measurement.

2. Method as in claim 1, in which at least a threshold value within which variations of the area of section of the bar are acceptable is stored in the control and command unit.

3. Method as in claim 1, in which a value of maximum difference between the measured area of section of the bar in transit and the normal nominal area of section of the bar in transit is stored in the control and command unit which, when the value of maximum difference is exceeded, orders the rolling line to be stopped and/or a part of the bar in transit to be discharged.

* * * * *